United States Patent
Guzmán et al.

(10) Patent No.: US 11,867,713 B2
(45) Date of Patent: Jan. 9, 2024

(54) OPTOMECHANICAL INERTIAL REFERENCE MIRROR FOR ATOM INTERFEROMETER AND ASSOCIATED METHODS

(71) Applicants: Arizona Board of Regents on Behalf of the University of Arizona, Tucson, AZ (US); Leibniz Universität Hannover, Hannover (DE)

(72) Inventors: Felipe Guzmán, Tucson, AZ (US); Ernst Maria Rasel, Tucson, AZ (US); Dennis Schlippert, Tucson, AZ (US)

(73) Assignees: Arizona Board of Regents on Behalf of The University of Arizona, Tuscon, AZ (US); Leibniz Universität Hannover, Hannover (DE)

( * ) Notice: Subject to any disclaimer, the term of this patent is extended or adjusted under 35 U.S.C. 154(b) by 0 days.

(21) Appl. No.: 17/430,797

(22) PCT Filed: Feb. 15, 2020

(86) PCT No.: PCT/US2020/018462
§ 371 (c)(1),
(2) Date: Aug. 13, 2021

(87) PCT Pub. No.: WO2020/168314
PCT Pub. Date: Aug. 20, 2020

(65) Prior Publication Data
US 2022/0163557 A1   May 26, 2022

Related U.S. Application Data

(60) Provisional application No. 62/806,520, filed on Feb. 15, 2019.

(51) Int. Cl.
*G01P 15/093* (2006.01)
*G01B 9/02* (2022.01)
(Continued)

(52) U.S. Cl.
CPC ........ *G01P 15/093* (2013.01); *G01B 9/02049* (2013.01); *G01P 15/0802* (2013.01); *G01V 7/04* (2013.01); *G01B 2290/25* (2013.01)

(58) Field of Classification Search
CPC .. G01P 15/093; G01P 15/0802; G01P 15/097; G01V 7/04; G01B 9/02049; G01B 2290/25; G01H 9/00
See application file for complete search history.

(56) References Cited

U.S. PATENT DOCUMENTS 6,921,894 B2   7/2005   Swierkowski
7,137,299 B2   11/2006   Meyer
(Continued)

OTHER PUBLICATIONS

Geiger, et al., Detecting Inertial Effects with Airborne Matter-Wave Interferometry, Nature Communications, published Sep. 20, 2011, 7 pages.
(Continued)

*Primary Examiner* — Helen C Kwok
(74) *Attorney, Agent, or Firm* — Cozen O'Connor

(57) ABSTRACT

An optomechanical inertial reference mirror combines an optomechanical resonator with a reflector that serves as an inertial reference for an atom interferometer. The optomechanical resonator is optically monitored to obtain a first inertial measurement of the reflector that features high bandwidth and high dynamic range. The atom interferometer generates a second inertial measurement of the reflector that features high accuracy and stability. The second inertial measurement corrects for drift of the first inertial measurement, thereby resulting in a single inertial measurement of the reflector having high bandwidth, high dynamic range, excellent long-term stability, and high accuracy. The reflector may be bonded to the resonator, or formed directly onto a test mass of the resonator. With a volume of less than one
(Continued)

cubic centimeter, the optomechanical inertial reference mirror is particularly advantageous for portable atomic-based sensors and systems.

22 Claims, 8 Drawing Sheets

(51) Int. Cl.
*G01P 15/08* (2006.01)
*G01V 7/04* (2006.01)

(56) References Cited

U.S. PATENT DOCUMENTS

| | | | |
|---|---|---|---|
| 9,417,261 B2 | 8/2016 | Salit et al. | |
| 2008/0193079 A1* | 8/2008 | Cheben | G02B 6/14 385/28 |
| 2010/0046002 A1* | 2/2010 | Perez | G01H 9/00 356/478 |
| 2012/0247213 A1* | 10/2012 | Zumberge | G01H 9/00 73/652 |
| 2014/0283601 A1* | 9/2014 | Bhave | G01B 11/14 73/504.12 |
| 2015/0020590 A1* | 1/2015 | Painter | G01N 21/55 438/48 |
| 2016/0334441 A1* | 11/2016 | Tin | G01P 21/00 |
| 2017/0371065 A1* | 12/2017 | Guzman | G01P 15/093 |
| 2019/0033187 A1* | 1/2019 | Shaw | G02B 17/004 |

OTHER PUBLICATIONS

Cheiney, et al., Navigation-Compatible Hybrid Quantum Accelerometer Using a Kalman Filter, arXiv:1805.06198v2, physics.atom-ph, Feb. 5, 2019, 11 pages.
Lautier, et al., Hybridizing Matter-Wave and Classical Accelerometers, arXiv:1410.00502v2, physics.atom-ph, dated Oct. 8, 2014, 5 pages.
Gouet, et al., Limits to the Sensitivity of a Low Noise Compact Atomic Gravimeter, arXiv.0801.1270V1, physics.atom-ph, dated May 29, 2018, 30 pages.
Schlippert, et al., Quantum Test of the University of Free Fall, arXiv:1406.4979v1, physics.atom-ph, dated Jun. 19, 2014, 5 pages.
Pisco, et al., Opto-Mechanical Lab-on-Fibre Seismic Sensors Detected the Norcia Earthquake, Scientific Reports, Nature.com, dated Apr. 27, 2018, 14 pages.
Stambaugh, et al., From Membrane-in-the-Middle to Mirror-in-the-Middle with a High-Reflectivity Sub-Wavelength Grating, arXiv:1407.1709v1, physics.optics, Jul. 7, 2014, 7 pages.
Cervantes, et al., High Sensitivity Optomechanical Reference Accelerometer Over 10kHz, arXiv:1303.1188v3, physics.optics, Aug. 28, 2014, 5 pages.
Gerberding, et al., Optomechanical Reference Accelerometer, arXiv.1504.01055v2, physics.optics, Apr. 9, 2015, 12 pages.
PCT Application No. PCT/US2020/018462, International Search Report and Written Opinion dated Apr. 29, 2020, 12 pages.
Richardson et al., Opto-Mechanical Resonator-Enhanced Atom Interferometry, https://arxi.org/abs/1902.02867, Feb. 7, 2019.

* cited by examiner

OPTOMECHANICAL INERTIAL REFERENCE MIRROR FOR ATOM INTERFEROMETER AND ASSOCIATED METHODS

RELATED APPLICATIONS

This application is a 35 U.S.C. § 371 filing of International Application PCT/US2020/018462, filed Feb. 15, 2020, which claims priority to U.S. Provisional Patent Application No. 62/806,520, filed Feb. 15, 2019 and titled "Optomechanical Inertial Reference for Atom Interferometers", the entirety of which is incorporated herein by reference.

BACKGROUND

Due to their precise control of matter waves, atom interferometers have become versatile tools for inertial sensing as well as fundamental physics, metrology, and quantum information. Types of inertial sensing for which atom interferometers may be used include gravimetry (e.g., measuring the earth's gravitational acceleration g), gravity gradiometry, accelerometry (i.e., linear accelerations), and gyroscopy (i.e., rotations).

SUMMARY OF THE EMBODIMENTS

Atom interferometers typically used for inertial sensing feature excellent accuracy and long-term stability, but are challenged by limited dynamic range. Furthermore, low signal-to-noise ratios require long measurement times that limit bandwidth. On the other hand, optomechanical resonators can be used to continuously measure acceleration with high bandwidth and dynamic range, but suffer from long-term drift and inaccuracy.

The present embodiments feature optomechanical inertial reference mirrors that combine an optomechanical resonator with a retroreflector that serves as an inertial reference for an atom interferometer. The optomechanical resonator includes a Fabry-Perot cavity that is optically probed to obtain an optical resonator signal that is a measure of the acceleration of the retroreflector, i.e., the optomechanical resonator is used as an optomechanical accelerometer. The optical resonator signal has a high bandwidth and high dynamic range, yet poor accuracy and drift. At the same time, the atom interferometer generates an atom interferometer signal with low drift and high accuracy, yet low bandwidth. The atom interferometer signal may be used to correct for drift of the optical resonator signal, thereby resulting in a single output that advantageously combines high bandwidth, high dynamic range, excellent long-term stability, and high accuracy. Furthermore, since the optomechanical resonator and the atom interferometer measure the same inertial reference (i.e., the retroreflector), high common-mode noise rejection can be achieved. With this combination of features, the hybrid interferometer can advantageously operate under strong perturbations without loss of the atomic phase information.

With a volume of one cubic centimeter or less, the optomechanical resonator is amenable to integration with compact atomic systems and sensors based on atom chips. This small size, along with the immunity of the hybrid interferometer to large inertial noises (e.g., vibrations, acoustic noise, shaking, etc.) makes the present embodiments particularly advantageous for field-deployable applications where portability and robustness to environmental perturbations is critical. Applications for inertial sensing include gravimetry, gravity gradiometry, accelerometry, and gyroscopy. The present embodiments may also be used to sense the quantum state of optomechanical resonators used in the field of cavity-quantum-optomechanics.

The present embodiments are vacuum compatible and emit negligible heat. In addition, they can be fabricated from non-magnetic materials, in which case they will not induce magnetic-field-related errors in the atom interferometer (e.g., due to Zeeman shifts). In some embodiments, an optomechanical inertial reference mirror is formed by joining (e.g., with epoxy or contact bonding) a compact optomechanical resonator with a retroreflector of an atom interferometer. In other embodiments, the retroreflector is formed directly onto a test mass of the optomechanical resonator. Any of the present embodiments may be placed in a vacuum chamber of the atom interferometer to benefit the performance of both the optomechanical resonator and the atomic interferometer.

In embodiments, an optomechanical inertial reference mirror includes a first cavity mirror affixed to a frame, and a test mass physically coupled with the frame via one or more bridges such that the test mass is displaced along a sensing direction relative to the frame when the frame accelerates along the sensing direction. The optomechanical inertial reference mirror also includes a reflector affixed to the test mass and configured to reflect an optical beam propagating along the sensing direction, and a second cavity mirror affixed to the test mass. The first and second cavity mirrors are counterfacing along the sensing direction to form a Fabry-Perot cavity with a cavity spacing that changes when the test mass is displaced relative to the frame along the sensing direction.

In other embodiments, an optomechanical inertial reference mirror includes a first cavity mirror affixed to a frame, a substrate affixed to the frame, and a test mass physically coupled with the frame via one or more bridges such that the test mass is displaced along a sensing direction relative to the frame when the frame accelerates along the sensing direction. The optomechanical inertial reference mirror also includes a second cavity mirror affixed to the test mass, and a reflector affixed to the substrate and configured to reflect an optical beam propagating along the sensing direction. The first and second cavity mirrors are counterfacing along the sensing direction to form a Fabry-Perot cavity with a cavity spacing that changes when the test mass is displaced relative to the frame along the sensing direction.

In other embodiments, a hybrid interferometry method includes measuring an acceleration of a frame along a sensing direction by optically sensing a displacement of a test mass relative to the frame along the sensing direction. The test mass is physically coupled with the frame via one or more bridges. The hybrid interferometry method also includes measuring, with an atom interferometer, an acceleration of the test mass along the sensing direction by reflecting an optical beam into a reflected optical beam with a reflector affixed to the test mass. The optical beam and the reflected optical beam counterpropagate along the sensing direction to interact with atoms of the atom interferometer.

In other embodiments, a hybrid interferometry method includes measuring an acceleration of a frame along a sensing direction by optically sensing a displacement of a test mass relative to the frame along the sensing direction. The test mass is physically coupled with the frame via one or more bridges. The hybrid interferometry method also includes measuring, with an atom interferometer, an acceleration of the frame along the sensing direction by reflecting an optical beam into a reflected optical beam with a reflector affixed to the frame. The optical beam and the reflected optical beam counterpropagate along the sensing direction to interact with atoms of the atom interferometer.

DETAILED DESCRIPTION OF THE EMBODIMENTS

Figure 1:
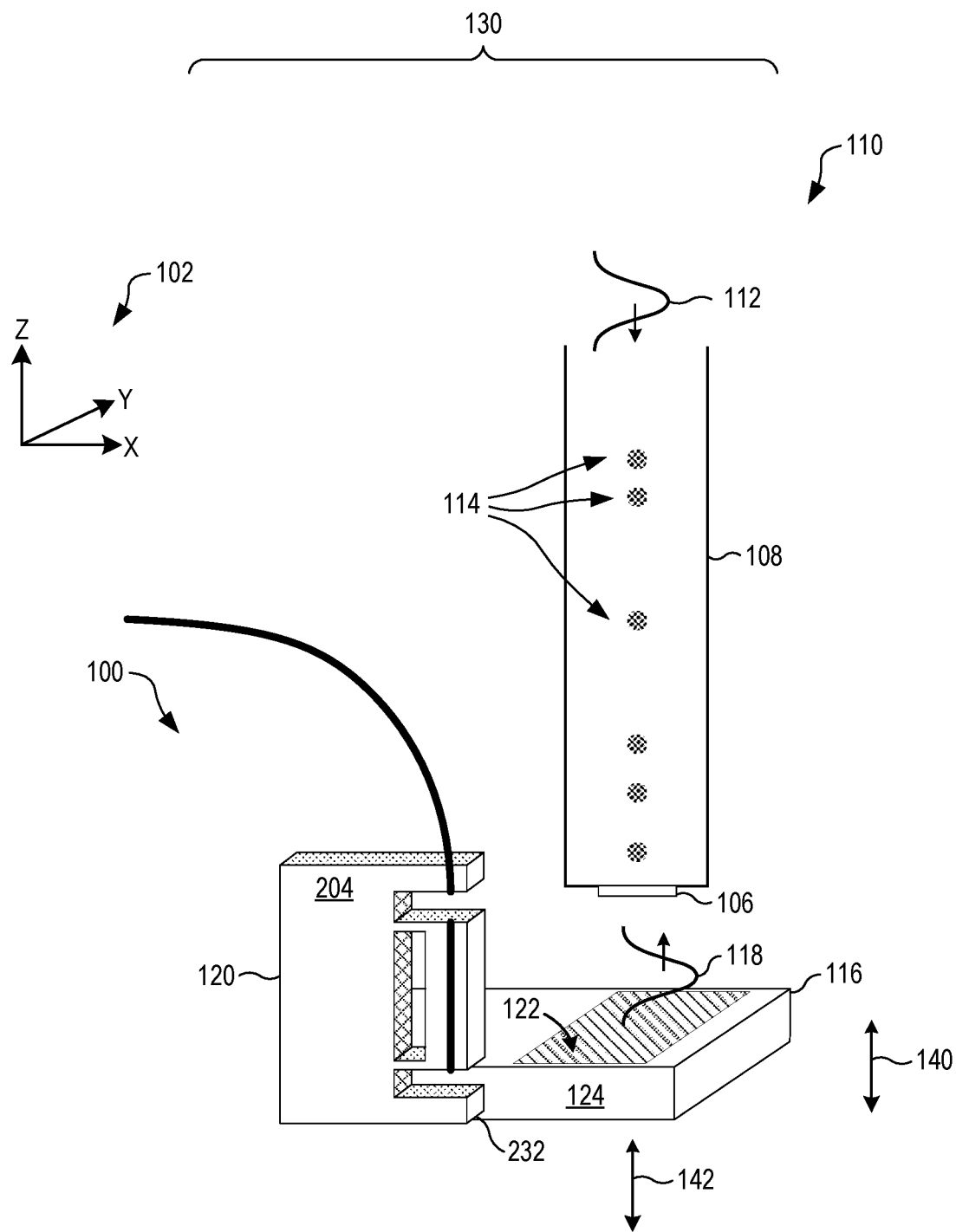
FIG. 1 shows an optomechanical inertial reference mirror being used with an atom interferometer as part of a hybrid interferometer, in an embodiment.

FIG. 1 shows an optomechanical inertial reference mirror 100 being used with an atom interferometer 110 as part of a hybrid interferometer 130. Hybrid interferometer 130 measures external acceleration 140 along a sensing direction 142 that is shown in FIG. 1 as parallel to a z-axis (see right-handed coordinate system 102). Optomechanical inertial reference mirror 100 is formed from an optomechanical resonator 120 that is joined with a reflector 116. As shown in FIG. 1, reflector 116 may be a retroreflector (i.e., a planar mirror) formed from a substrate 124 having a reflective coating 122 deposited thereon.

In the embodiment of FIG. 1, atom interferometer 110 is a light-pulse atom interferometer. During operation of atom interferometer 110, a light pulse 112 propagating in the negative z direction (−z) is retroreflected by reflector 116 into a reflected light pulse 118 that propagates in the positive z direction (+z). Light pulses 112 and 118 interact with atoms 114 that have been cooled (e.g., via laser cooling) to temperatures low-enough that they may be considered as matter waves 114 (i.e., atoms 114 have de Broglie wavelengths comparable to, or greater than, a wavelength of light pulses 112 and 118, or approximately 0.5 µm, typically corresponding to a temperature below 1 mK). Gravity acts in the negative z direction, and thus atoms 114 undergo free-fall in the negative z direction in the absence of any other acceleration in the z direction.

Properties of light pulse 112 (e.g., intensity, phase, frequency, pulse duration, linewidth, sideband generation, etc.) are selected to implement processes that split, redirect, and/or recombine matter waves 114. More specifically, a first light pulse 112 cooperates with a first reflected light pulse 118 to split matter waves 114 into a coherent superposition of two composite states of different external momenta (e.g., $\pm\hbar k$, where k is the wavenumber of light pulses 112 and 118, and $\hbar$ is Planck's constant divided by $2\pi$) and different internal energies of the atomic species (e.g., the |F=1⟩ and |F=2⟩ ground hyperfine states of $^{87}$Rb). After a first interrogation time T/2, during which atoms 114 precess in the dark (i.e., in an absence of light pulses 112 and 118), a second light pulse 112 cooperates with a second reflected light pulse 118 to redirect split matter waves 114. After a second interrogation time T/2, a third light pulse 112 cooperates with a third reflected light pulse 118 to recombine split matter waves 114 and generate interference between recombined matter waves 114. A phase of recombined matter waves 114 may be subsequently determined by reading the number of atoms 114 in each of the two internal energy states, such as by state-selective fluorescence detection. One measurement cycle of atom interferometer 110 includes: initial preparation of atoms 114, the sequence of three light pulses and two interrogation times, and the final measurement of the resulting matter-wave phase shift.

Matter waves 114 are phase-shifted proportionally to the relative acceleration between atoms 114 and reflector 116 along sensing direction 142. Herein, external acceleration 140 is the acceleration of reflector 116 in the laboratory frame. Thus, when reflector 116 is at rest in the laboratory frame, external acceleration 140 of reflector 116 is 0 m/s² and matter waves 114 are phase-shifted only by gravity. When acceleration 140 of reflector 116 is non-zero in the laboratory frame, matter waves 114 are additionally phase-shifted by aT², where a is the magnitude (including sign) of external acceleration 140. When external acceleration 140 is not aligned with sensing direction 142, atom interferometer 110 measures the component of external acceleration 140 aligned with sensing direction 142.

Figure 2:
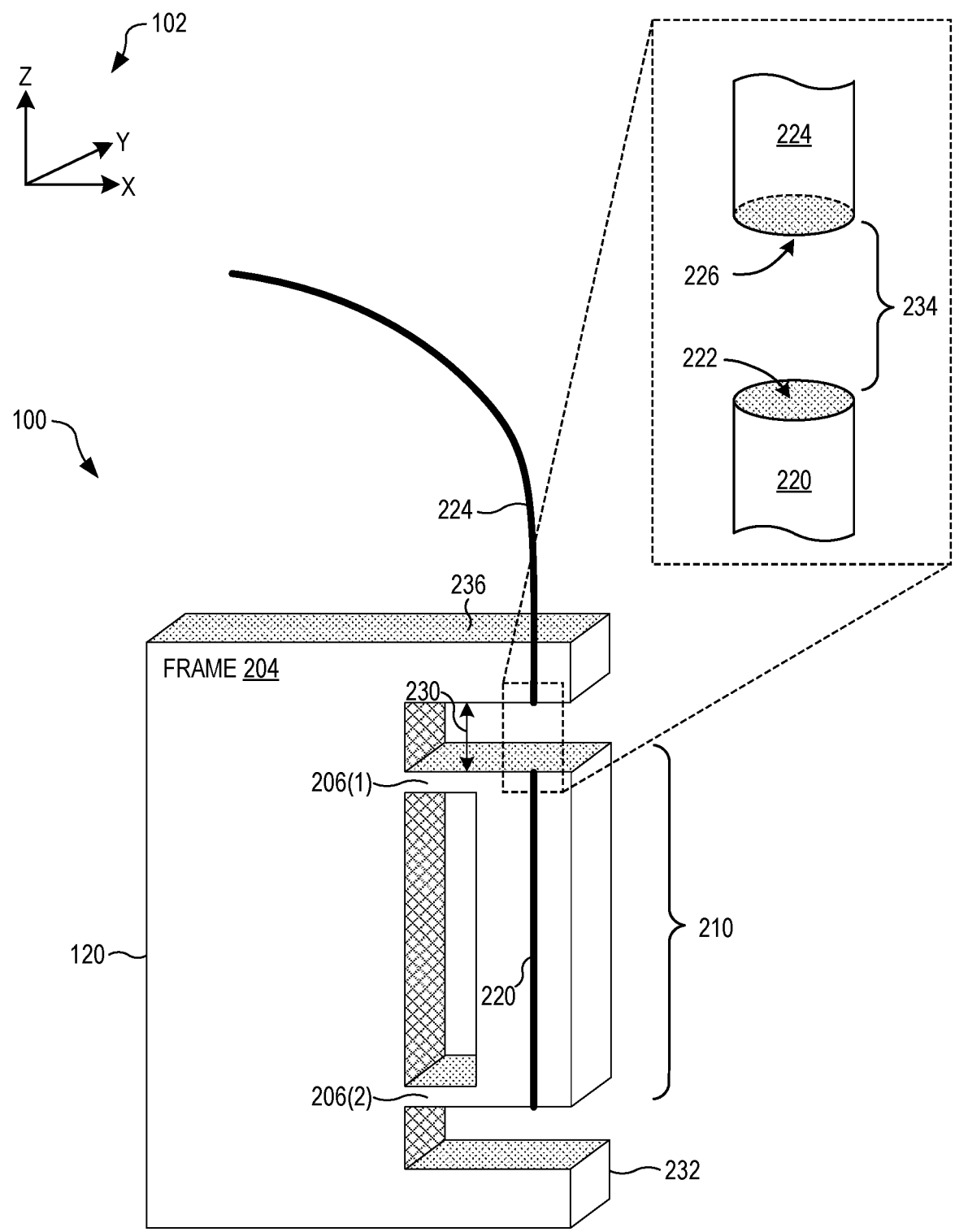
FIG. 2 shows an optomechanical resonator of the optomechanical inertial reference mirror of FIG. 1 in more detail.

FIG. 2 shows optomechanical resonator 120 of optomechanical inertial reference mirror 100 of FIG. 1 in more detail. Optomechanical resonator 120 has a test mass 210 mechanically coupled to a frame 204 via first and second bridges 206(1), 206(2) that serve as springs. Attached to a top leg 236 of frame 204 is an optical fiber 224 with a first mirror-coated face 226. Attached to test mass 210 is a fiber-optic-based mirror 220 formed from a piece of optical fiber having a second mirror-coated face 222. First and second mirror-coated faces 226, 222 are counterfacing along the z direction to form a Fabry-Perot cavity 234.

As shown in FIG. 1, optomechanical resonator 120 is oriented relative to reflector 116 to measure external acceleration 140 along sensing direction 142. In response to external acceleration 140 of reflector 116 (i.e., the component of external acceleration 140 aligned with sensing direction 142), bridges 206(1) and 206(2) bend so that test mass 210 moves along sensing direction 142 relative to frame 204, changing a spacing 230 between first and second mirror-coated faces 226 and 222, thereby changing resonant optical frequencies of corresponding fringes (i.e., longitudinal modes) of Fabry-Perot cavity 234. Equivalently, external acceleration 140 shifts the fringes in frequency space to produce corresponding fringe excursions.

To measure a fringe excursion of Fabry-Perot cavity 234, light propagating along optical fiber 224 is coupled into Fabry-Perot cavity 234 via first mirror-coated face 226. Some of the light resonant with Fabry-Perot cavity 234 couples out of Fabry-Perot cavity 234 through first mirror-coated face 226, and is guided along optical fiber 224 to a circulator that directs the out-coupled light into a photodetector that converts the received out-coupled light into an optical resonator signal (see FIG. 6e). Light coupling out of Fabry-Perot cavity 234 through second mirror-coated face 222 may be blocked, or otherwise ignored.

Atom interferometer 110 and optomechanical resonator 120 may be used to measure external acceleration 140 of reflector 116 simultaneously. Furthermore, at frequencies below the lowest resonant frequency of optomechanical inertial reference mirror 100, frame 204 accelerates similarly to reflector 116 in response to external acceleration 140. In response to frame 204 accelerating, test mass 210 is displaced along sensing direction 142 proportionally to the acceleration of frame 204 (i.e., external acceleration 140, or a component thereof, aligned with sensing direction 142), thereby changing spacing 230 by the distance. Optomechanical resonator 120 can be used to detect external acceleration 140 aligned with sensing direction 142 by optically measuring changes in spacing 230 with Fabry-Perot cavity 234.

In FIG. 1, optomechanical resonator 120 is affixed to substrate 124 of reflector 116 via a bottom leg 232 of frame 204. Optomechanical resonator 120 and substrate 124 may be joined via epoxy, anodic bonding, fritting, contact bonding, or another joining/bonding technique. Alternatively, optomechanical resonator 120 and substrate 124 may be formed as a single monolithic element.

Reflective coating 122 may be deposited onto substrate 124 using techniques known in the art. For example, reflective coating 122 may be a multi-layer dielectric coating formed via ion-beam sputtering, which routinely achieve reflectivities of 99.99% via Bragg reflection. Such high reflectivities may be important for creating an optical lattice when atom interferometer 110 is based on atomic Bragg diffraction. However, another type of reflective surface (e.g., metal), thin-film deposition method (e.g., chemical vapor deposition, physical vapor deposition, atomic layer deposition, evaporation), and/or Bragg reflection architecture may be used without departing from the scope hereof. For example, reflector 116 may be a sub-wavelength grating mirror formed by patterning sub-wavelength features on a silicon nitride membrane. Alternatively, reflector 116 may be a cat's eye retroreflector, a corner cube retroreflector, or another type of retroreflecting optical element.

While FIG. 1 shows reflector 116 as a retroreflector, reflector 116 may alternatively be a turning mirror that reflects, but not retroreflects, light pulse 112. For example, reflector 116 may be a 90° turning mirror that reflects vertically propagating light pulse 112 into a horizontally propagating light pulse (or vice versa). Furthermore, while FIG. 1 shows reflector 116 as reflecting light pulse 112, reflector 116 may alternatively reflect continuous-wave light.

Advantageously, hybrid interferometer 130 combines the benefits of optomechanical resonator 120 and atom interferometer 110 in a single system. Optomechanical resonator 120 can measure external acceleration 140 of reflector 116 with better short-term measurement characteristics (e.g., short-term instability, noise floor, sensitivity, bandwidth, etc.) than atom interferometer 110. Thus, optomechanical resonator 120 may be used to determine the short-time measurement characteristics of hybrid interferometer 130. For example, a bandwidth of the optical resonator signal obtained from optomechanical resonator 120 is typically limited by the lowest resonant frequency of optomechanical inertial reference mirror 100, which may be as high as several kilohertz, depending on the mechanical design of optomechanical resonator 120 and/or reflector 116. By comparison, the bandwidth of atom interferometer 110 is primarily limited by the total interrogation time T. A typical value for T is 20 ms, corresponding to a maximum bandwidth of 50 Hz. In practice, the bandwidth of atom interferometer 110 is usually less than this due to the additional time needed in each measurement cycle to initially prepare atoms 114.

On the other hand, atom interferometer 110 can measure external acceleration 140 of reflector 116 with better long-term measurement characteristics (e.g., long-term instability, thermal drift, accuracy) than optomechanical resonator 120 since atom interferometer 110 relies on the internal energy level structure of the atomic species as well as the accuracy and stability of an effective wave vector equal to a difference of the wavevectors of light pulses 112 and 118. By comparison, the long-term stability of the optical resonator signal is typically limited by thermal drift (e.g., expansion and contraction) of test mass 210, frame 204, and/or substrate 124. Thus, the long-term measurement characteristics of atom interferometer 110 may be used to determine the long-term measurement characteristics of hybrid interferometer 130.

Another advantage of hybrid interferometer 130 is that optomechanical resonator 120 can measure external acceleration 140 of reflector 116 with a larger dynamic range than atom interferometer 110. Therefore, measurements of external acceleration 140 from optomechanical resonator 120 can be used to uniquely identify which atomic fringe is being concurrently interrogated by atomic interferometer 110, i.e., optomechanical resonator 120 can be used to remove the $2\pi$ ambiguity that typically arises in atom interferometers. For example, the optical resonator signal may be convolved with the transfer function of atom interferometer 110 to compute a phase correction that may be applied to the corresponding matter-wave phase measured with atom interferometer 110.

The optical resonator signal may be continuously outputted to a user and periodically corrected based on the atom-interferometric measurements from atom interferometer 110. For example, when atom interferometer 110 operates with a cycle time of 50 ms, the optical resonator signal may be periodically corrected every 50 ms based on the most recent measurement from atom interferometer 110. Thus, hybrid interferometer 130 operates similarly to an atomic clock, where the frequency of a continuously-outputted electrical signal from a quartz oscillator (e.g., 10 MHz sine wave) is periodically corrected based on recurring atom-based time measurements.

Figure 3:
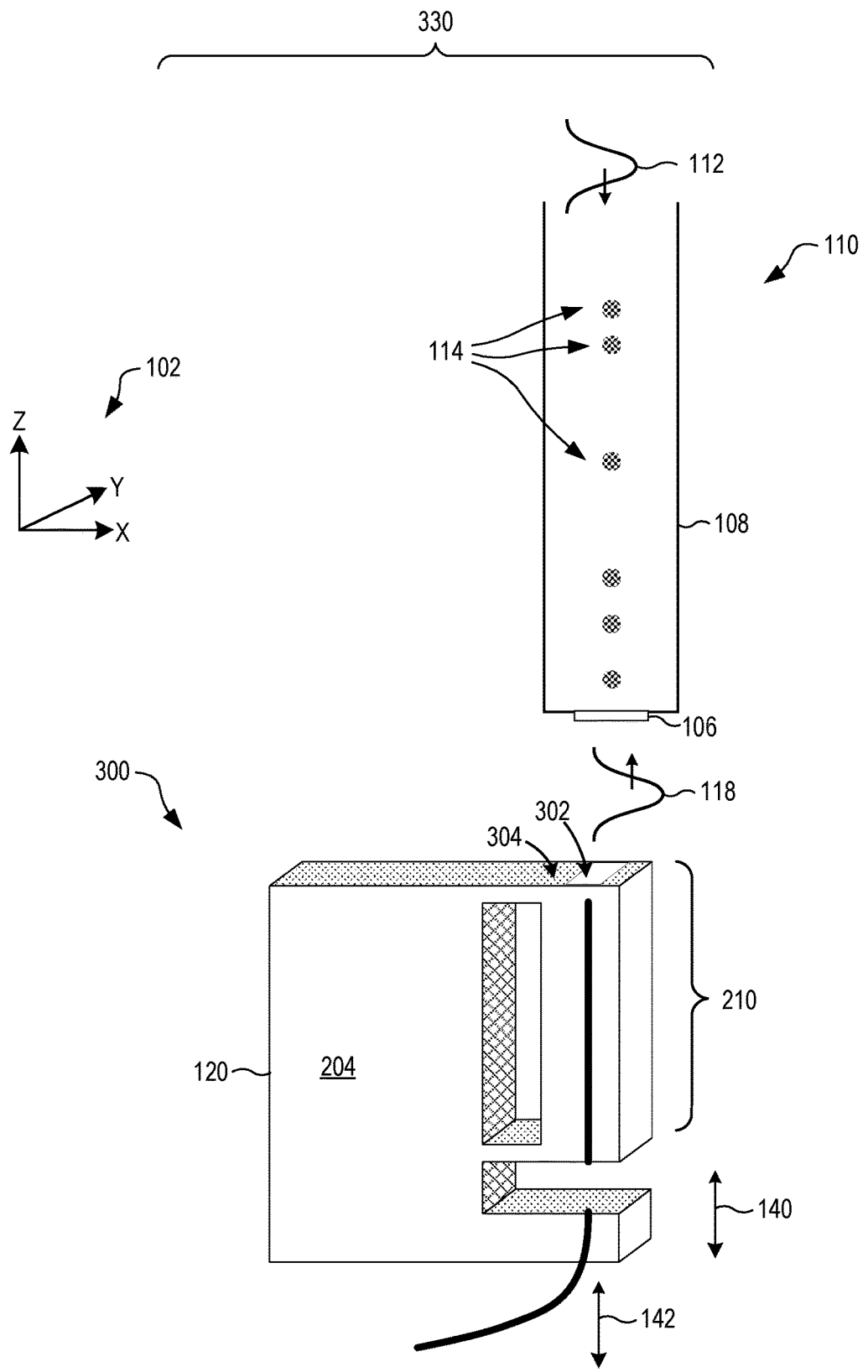
FIG. 3 shows an optomechanical inertial reference mirror that is similar to the optomechanical inertial reference mirror of FIG. 1, except that a reflector is affixed directly to a test mass, in an embodiment.

FIG. 3 shows an optomechanical inertial reference mirror 300 that is similar to optomechanical inertial reference mirror 100 of FIG. 1 except that a reflector 302 is affixed directly to its test mass 210. FIG. 3 shows optomechanical inertial reference mirror 300 being used with atom interferometer 110 as part of a hybrid interferometer 330 that, like hybrid interferometer 130 of FIG. 1, can be used to measure external acceleration 140 along sensing direction 142. As shown in FIG. 3, reflector 302 is located on a top surface 304 of test mass 210 to reflect light pulse 112 into reflected light pulse 118. Thus, reflector 302 is similar to reflector 116 of FIG. 1.

With optomechanical inertial reference mirror 300, atom interferometer 110 directly measures the acceleration of test mass 210, as opposed to its frame 204. Optomechanical inertial reference mirror 300 may be characterized by a mechanical transfer function that can be measured and used to convert the acceleration of its test mass 210, as measured by atom interferometer 110, into a corresponding acceleration of its frame 204.

Figure 4:
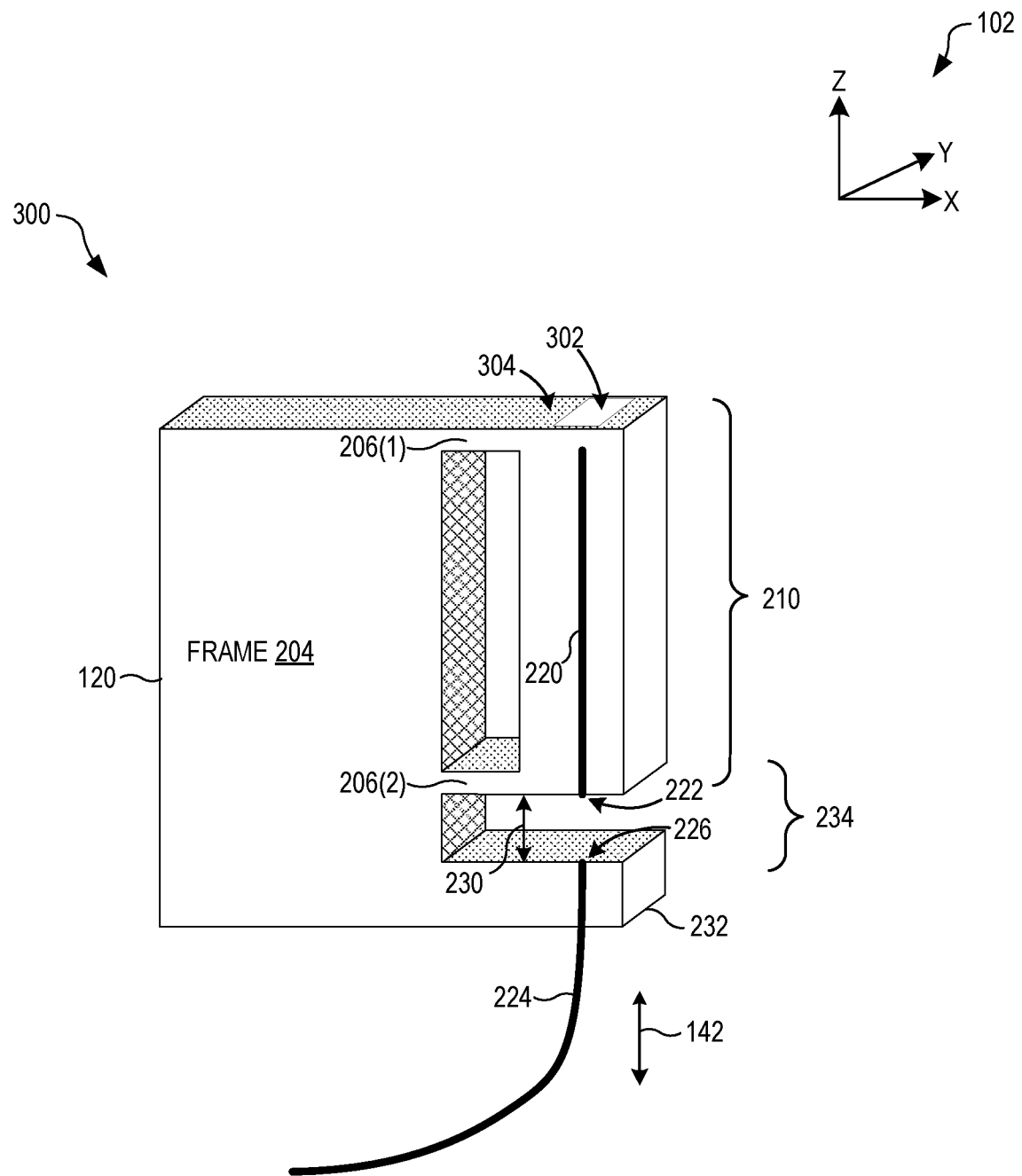
FIG. 4 shows the optomechanical inertial reference mirror of FIG. 3 in more detail.

FIG. 4 shows optomechanical inertial reference mirror 300 of FIG. 3 in more detail. Optomechanical inertial reference mirror 300 also includes an optomechanical resonator 120, similar to optomechanical resonator 120 of FIG. 1 except that top leg 236 (see FIG. 2) is removed to provide optical access to reflector 302. Fiber-optic-based mirror 220 is attached to test mass 210 such that second mirror-coated face 222 is positioned at a bottom (in the z direction) of test mass 210. Optical fiber 224 attaches to bottom leg 232 so that first and second mirror-coated faces 226 and 222 are counterfacing along sensing direction 142 and separated by spacing 230 to form Fabry-Perot cavity 234.

The removal of top leg 236 allows reflector 302 to be deposited on top surface 304 using techniques known in the art. For example, reflector 302 may be a multi-layer dielectric coating deposited directly only top surface 304 with ion-beam sputtering techniques. However, another type of reflective surface (e.g., metal), thin-film deposition method (e.g., chemical vapor deposition, physical vapor deposition, atomic layer deposition, evaporation), and/or Bragg reflection architecture may be used without departing from the scope hereof. For example, a sub-wavelength grating mirror may be formed by patterning sub-wavelength features on top surface 304.

To enhance the accuracy of atom interferometer 110, the wavevector of each of light pulses 112 and 118 should be uniform across the corresponding transverse beam profile so that all of atoms 114 are driven with the same two wavevectors regardless of where in the transverse beam profile they lie. This requirement is equivalent to flat wavefronts, i.e., each of light pulses 112 and 118 should be shaped as close to a plane wave as feasible. To minimize wavefront curvature of light pulses 112 and 118, light pulse 112 may be shaped to have a large cross-sectional spot size, which facilitates better collimation of light pulse 112. Reflector 302 may be a planar retroreflector that does not focus or defocus light pulse 112 upon reflection, thereby preserving the collimation of light pulse 112 in reflected light pulse 118. Furthermore, reflector 302 may be sized (in the x-y plane) greater than the spot size of light pulse 112 to minimize diffraction of light pulse 112 off edges of reflector 302; such diffraction can degrade the collimation of reflected light pulse 118.

One aspect of the embodiments disclosed herein is the realization that there is a trade-off between spot size and dimensions of test mass 210. The spot size of light pulses 112 and 118 may be as large as several centimeters for an atom interferometer designed to maximize accuracy over other performance metrics. On the other hand, the spot size of light pulses 112 and 118 may be as small as 1 mm or 2 mm for compact atom interferometers that emphasize portability. The choice of spot size constrains the size of reflector 302 in the x-y plane, and thus the width (in the x direction) and length (in the y direction) of test mass 210. The remaining height (in the z direction) of test mass 210 may then be selected to obtain a desired mass for test mass 210, and other properties of optomechanical inertial reference mirror 300 (e.g., size, shape, and location of bridges 206) may be adjusted to obtain a desired mechanical response of optomechanical inertial reference mirror 300.

This newly-identified trade-off between spot size and dimensions of test mass 210 may be combined with other known trade-offs to design hybrid interferometer 330 to achieve a full set of desired specifications. These tradeoffs may be evaluated using computer modeling (e.g., finite-element analysis) of optomechanical inertial reference mirror 300 to achieve a desired mechanical response of optomechanical inertial reference mirror 300 that is commensurate with the desired specifications. For example, the frequency of a mechanical resonance typically decreases with mass, and thus when a mass of test mass 210 is large, the bandwidth of optomechanical resonator 120 may need to be reduced accordingly. Alternatively, the spring constant of bridges 206 may be increased to raise the mechanical resonant frequency, albeit at the expense of sensitivity (i.e., scale factor). Spring constants of bridges 206 may be changed, for example, by changing the length (in the x direction) and/or cross-sectional area (in the y-z plane) of bridges 206, and locations of bridges 206 relative to test mass 210. Furthermore, while optomechanical resonator 120 is shown in FIGS. 1-4 as having two bridges 206, optomechanical resonator 120 may have a different number of bridges 206 without departing from the scope hereof.

Properties of the material used to fabricate optomechanical inertial reference mirror 300 (e.g., Young's modulus) may also affect the transfer function of optomechanical inertial reference mirror 300, and thus may also be selected according to desired specifications of hybrid interferometer 330. Examples of materials that may be used for optomechanical inertial reference mirror 300 include fused silica, silicon, silicon nitride, sapphire, diamond, quartz, and glass (e.g., borosilicate). Other materials may be used without departing from the scope hereof.

Optomechanical inertial reference mirror 300 may be formed using any fabrication process compatible with the material forming optomechanical inertial reference mirror 300. Thus, optomechanical inertial reference mirror 300 may be formed by machining, grinding (e.g., with diamond bits), cleaving, and/or etching (e.g., DRIE) a solid piece of stock of the material to form test mass 210, bridges 206, and frame 204 as one monolithic element. After fabrication, top surface 304 may be lapped and polished so that it is optically flat, thereby ensuring that reflector 302 forms a planar retroreflective mirror when deposited on top surface 304.

While FIG. 3 shows optomechanical inertial reference mirror 300 being used with atom interferometer 110, optomechanical inertial reference mirror 300 may be alternatively used in another device/system that benefits from measuring the acceleration of an optical component. Therefore, in some embodiments, top surface 304 is formed to be non-planar so that reflector forms a non-planar mirror, such as a parabolic mirror, cylindrical mirror, or spherical mirror. In other embodiments, top surface 304 is angled such that reflector 302 forms a turning mirror that steers reflected light pulse 118 away from the incoming direction of light pulse 112. In another embodiment, top surface 304 is formed with v-grooves such that reflector 302 forms a corner-cube retroreflector.

While FIGS. 1-4 show Fabry-Perot cavity 234 formed from counterfacing first and second mirror-coated faces 226, 222 on optical fibers, Fabry-Perot cavity 234 may be alternatively formed from two counterfacing free-space mirrors, or one mirror-coated face of one optical fiber and one free-space mirror counterfacing the one mirror-coated face. For example, fiber-optic-based mirror 220 may be replaced by a small free-space optic affixed to a bottom surface (along the z direction) or a side surface of test mass 312. In one embodiment, optomechanical inertial reference mirror 300 is formed from metal, wherein the bottom face of test mass 210 has sufficient inherent reflectivity to serve as one of the counterfacing mirrors forming Fabry-Perot cavity 234. When first mirror-coated face 226 is replaced with a free-space equivalent mirror, light may be coupled into Fabry-Perot cavity 234 via free-space optics instead of via optical fiber 224.

Figure 5:
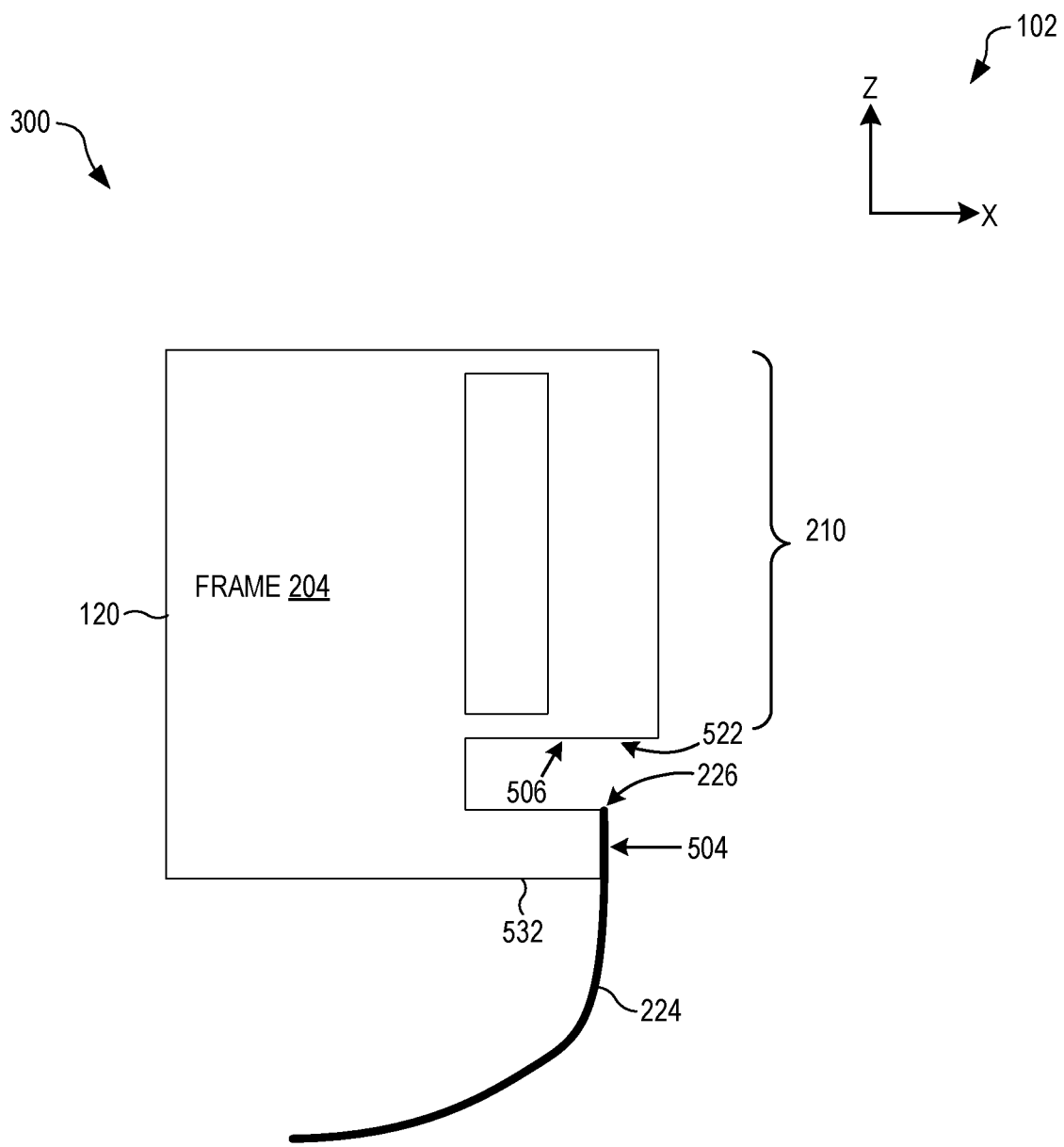
FIG. 5 is a side view of the optomechanical inertial reference mirror of FIGS. 3 and 4 configured with a shortened bottom leg, in an embodiment.

FIG. 5 is a side view of optomechanical inertial reference mirror 300 of FIGS. 3 and 4 configured with a shortened bottom leg 532. Specifically, test mass 210 extends in the positive x direction past an end face 502 (lying parallel to the x-z plane) of shortened bottom leg 532. Advantageously, shortened bottom leg 532 provides additional access to a bottom face 506 (lying parallel to the x-y plane) of test mass 210 such that a mirror coating 522 (or another type of reflector) may be applied directly to bottom face 506 (e.g., via evaporation of a metal). Thus, mirror coating 522 deposited on bottom face 506 replaces fiber-optic-based mirror 220 to serve as one of the counterfacing cavity mirrors forming Fabry-Perot cavity 234 without the need to epoxy and align fiber-optic-based mirror 220 to test mass 210. Although not shown in FIG. 5, a vertically-oriented (i.e., along the z direction) v-groove may be formed in end face 504 to receive optical fiber 224, facilitate alignment of second mirror-coated face 226 with respect to mirror coating 522, and enhance affixing of optical fiber 224 to shortened leg 532 by increasing the contact area between optical fiber 224 and end face 504.

In some embodiments, reflector 302 is a bulk optic affixed to top surface 304 by epoxy, contact bonding, anodic bonding, physical clamping, or another joining/bonding technique. These embodiments may be advantageous when directly depositing optical thin films on top surface 304 is unfeasible. For example, as an alternative to the above example where top surface 304 forms a corner-cube retroreflector, a bulk-optic corner-cube retroreflector may first be fabricated as a stand-alone component and then affixed to top surface 304. In other embodiments, a different type of optic is affixed to top surface 304, such as a retroreflector prism (e.g., a trihedral prism), right-angle prism, cat's eye retroreflector, hollow-roof prism, a turning mirror, or another type of retroreflector. In these embodiments, the bulk optic to be affixed to top surface 304 may be fabricated with, or installed in a mount having, a planar back face that lies flat on planar top surface 304 to facilitate bonding thereto.

Optomechanical inertial reference mirror 300 may be configured for operation in a vacuum system (e.g., an ultrahigh vacuum environment) or ambient conditions (e.g., atmospheric pressure). In FIGS. 1 and 3, atoms 114 are located in a vacuum system 108 to maintain their cold temperature throughout the measurement cycle of atom interferometer 110. When optomechanical inertial reference mirror 100 is located outside of vacuum system 108, as shown in FIG. 1, light pulse 112 passes through a vacuum window 106 to reach reflector 116. Optomechanical inertial reference mirror 300 may also be placed similarly outside of vacuum system 108, as shown in FIG. 3. The advantage of placing optomechanical inertial reference mirror 100 and/or 300 outside of vacuum system 108 is that light may be coupled via optical fiber 224 into Fabry-Perot cavity 234 without having to pass the light into and out of vacuum system 108 (e.g., via a vacuum fiber-optic feedthrough). Alternatively, optomechanical inertial reference mirror 100 and/or 300 may be placed inside vacuum system 108, advantageously removing the need for vacuum window 106, which may deteriorate wavefront curvature of light pulses 112 and/or 118, add spurious reflections of light pulses 112 and/or 118, and introduce an imbalance of the intensities of light pulses 112 and 118 (due to a less than 100% transmission of light pulses 112 and 118 through vacuum window 106).

While hybrid interferometer 130 of FIG. 1 and hybrid interferometer 330 of FIG. 3 sense changes in spacing 230 with Fabry-Perot cavity 234, one or both of hybrid interferometers 130 and 330 may use a different type of optical interferometer to measure spacing 230 and changes thereto, such as a Mach-Zehnder interferometer or a Michelson interferometer. The different type of optical interferometer may be constructed from free-space optics, fiber optics, or a combination thereof.

By incorporating a retroreflecting mirror directly onto a test mass, optomechanical inertial reference mirror 300 may be smaller than optomechanical inertial reference mirror 100 of FIG. 1. Similarly, optomechanical inertial reference mirror 300 may be more mechanically rigid than optomechanical inertial reference mirror 100, which allows for higher mechanical resonant frequencies, and thus a higher sensor bandwidth of optomechanical resonator 120. Since optomechanical inertial reference mirror 300 has fewer parts than optomechanical inertial reference mirror 100, it may be easier to manufacture and assemble, and it may simplify alignment of the cavity axis of Fabry-Perot cavity 234 with the direction normal to top surface 304.

To further appreciate the mechanical advantages of optomechanical inertial reference mirror 300 over optomechanical inertial reference mirror 100, consider that optomechanical resonator 120 may be affixed to substrate 124 via epoxy, adhesive, contact bonding, fritting, or another technique. This adhesion forms a bond between optomechanical resonator 120 and substrate 124 that is likely weaker than the bulk material of optomechanical resonator 120 and the bulk material forming substrate 124. The bond may be modeled as a spring, and its presence in the composite structure may negatively impact the transfer function of optomechanical resonator 120. For example, the presence of the bond may introduce mechanical resonances of the composite structure that are not present in the monolithic equivalent (i.e., the composite structure formed from one piece of stock without bonds). The bond may also lower the frequencies of mechanical resonances in the monolithic equivalent. In both cases, the bond reduces the maximum usable bandwidth of optomechanical resonator 120.

Hybrid interferometer 130 and/or hybrid interferometer 330 may each be configured in either an "open-loop" or "closed-loop" configuration. In the open-loop configuration, measurements from optomechanical resonator 120 and atom interferometer 110 are combined and post-processed to obtain one corrected measurement of external acceleration 140. In the closed-loop configuration, a measurement from optomechanical resonator 120 may be used to adjust the phase of light pulse 112 (e.g., with an electro-optic phase modulator) such that atom interferometer 110 interrogates atoms 114 on the same atomic fringe, and at the same position of the atomic fringe, with each measurement cycle. Operating on the same atomic fringe, and at the same position of the atomic fringe (e.g., top or side of the fringe) ensures that atom interferometer 110 measures external acceleration 140 with the same sensitivity with each measurement cycle, regardless of the magnitude of external acceleration 140. Closed-loop operation may advantageously improve linearity of hybrid interferometer 130 and/or hybrid interferometer 330, as compared to open-loop operation.

Systems and methods presented herein may be configured to improve any type of atom interferometer that measures external acceleration 140 of a retroreflecting mirror, including atomic gravimeters, gravity gradiometers, accelerometers, gyroscopes, and seismometers. FIGS. 1 and 3 show cold atoms 114 falling downward due to gravity, such as occurs in an atomic fountain where cold atoms are launched upward against gravity prior to falling downward, or in an apparatus that drops cold atoms 114 from "rest" at the beginning of each measurement cycle.

In FIGS. 1 and 3, each light pulse 112 and corresponding reflected light pulse 118 travels along the same vertical path (i.e., in the z direction). In other embodiments, each light pulse 112 and corresponding reflected light pulse 118 propagates through atoms 114 perpendicularly to the motion of atoms 114 to measure a horizontal acceleration. For example, each light pulse 112 and corresponding reflected light pulse 118 may propagate along a horizontal line that is perpendicular to the vertical path along which atoms 114 fall. In this example, optomechanical inertial reference mirror 300 may be oriented sideways such that reflector 302 retroreflects light pulse 112 horizontally into reflected light pulse 118.

Furthermore, each type of light pulse 112 (i.e., split, redirect, and recombine) and corresponding reflected light pulse 118 may occur at a different vertical position, thereby forming spatially-separated interaction zones. More specifically, as atoms 114 fall downward under gravity, they first pass through a first interaction zone formed by a first horizontally-propagating light pulse 112 and corresponding reflected light pulse 118 that split matter waves 114. As split matter waves 114 continue to fall, they subsequently pass through a second interaction zone formed by a second horizontally-propagating light pulse 112 and corresponding reflected light pulse 118 that redirect split matter waves 114. As split matter waves 114 fall further, they finally pass through a third interaction zone formed by a third horizontally-propagating light pulse 112 and corresponding reflected light pulse 118 that recombine split matter waves 114. In this example, three of optomechanical inertial reference mirror 300 may be used, one for each of the first, second, and third zones. The three optical resonator signals outputted by the three optomechanical resonators 120 may be combined to generate one phase correction that may be applied to the corresponding matter-wave phase measured with atom interferometer 110.

In other embodiments, atoms 114 are launched perpendicularly to gravity to form a horizontally-moving beam of atoms 114. In one of these embodiments, all light pulses 112 and corresponding reflecting light pulses 118 propagate along the horizontal line of motion of atoms 114 (ignoring sag of atoms 114 due to gravity), thereby implementing hybrid interferometer 330 in a horizontal orientation. Alternatively, light pulses 112 and corresponding reflecting light pulses 118 may perpendicularly intersect the horizontal line of motion to generate spatially-separated interaction zones, as described above, through which the horizontal beam of atoms 114 pass.

In the above examples, atom interferometer 110 uses a sequence of three light pulses 112 (and corresponding reflected light pulses 118) to split, redirect, and recombine matter waves 114, thereby implementing a Mach-Zehnder interferometer. However, atom interferometer 110 may operate with more than three light pulses 112 to implement another type of atom interferometer architecture. For example, atom interferometer 110 may operate with four light pulses 112 to implement a Ramsey-Bordé interferometer.

Optomechanical inertial reference mirror 300 may also be advantageously used to retroreflect a laser beam to generate an optical lattice (i.e., an optical standing wave) that diffracts matter waves 114 via Bragg diffraction, thereby implementing a Bragg-diffraction atom interferometer that does not utilize Raman transitions between internal states of the atomic species. Like the examples above, a Bragg-diffraction atom interferometer measures acceleration of the retroreflecting mirror relative to the atoms (i.e., along the axis of the optical lattice), and thus may be advantageously combined with optical resonator 120 to form a hybrid interferometer.

Experimental Demonstration

Figure 6:
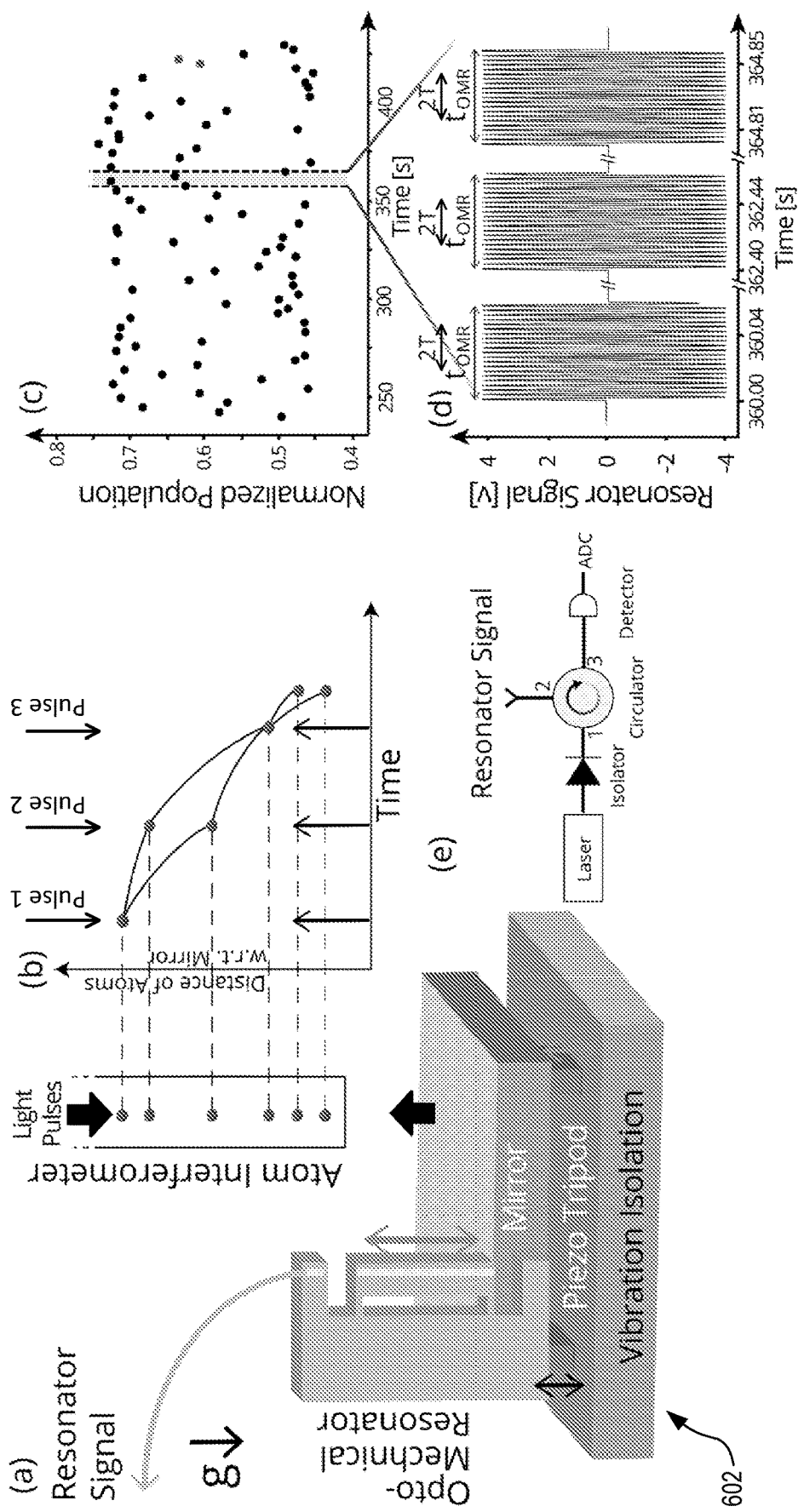
FIG. 6 shows a schematic of one optomechanical atom-interferometric hybrid device used to test a prototype optomechanical inertial reference mirror.

FIG. 6 shows a schematic of one optomechanical atom-interferometric hybrid device 602 used to test a prototype optomechanical inertial reference mirror. The hybrid device 602 combines a rubidium Raman-type atom interferometer with a prototype of optomechanical resonator 120 whose volume was on the order of a few hundred cubic millimeters (see FIG. 6a). This optomechanical resonator prototype was adhesively bonded to a two-inch square mirror that was used to retroreflect incident light pulses driving a sequence of three Raman processes. The incident and retroreflected light pulses coherently split, redirect, and recombine matter waves of $^{87}$Rb as part of the Raman-type atom interferometer. The atom-interferometer phase was determined by measuring the number of atoms in each of the output ports (e.g., by means of state-selective fluorescence detection). A constant acceleration a of the atoms along the vector normal to the square mirror (e.g., along sensing direction 142 in FIG. 1) induces a phase shift equal to $f_{\mathit{eff}} \cdot \vec{a} \cdot T^2$, where $k_{\mathit{eff}}$ is the effective wave vector of the incident and retroreflected light pulses, and T denotes the pulse separation time between the three light pulses. Typically, the atom interferometer's response is adjusted by varying the pulse separation time T such that ambient noise induces phase shifts well within one fringe.

As shown in FIG. 6a, the optomechanical resonator prototype was formed by the opposed ends of two optical fibers attached to a u-shaped mount made of fused silica, the cantilever, and a rigid counterpart. Fabry-Perot cavity 234 of the optomechanical resonator prototype had a finesse $\mathcal{F}$ of about two, a resonance frequency of 7.7 kHz, and a quality factor Q of approximately 1,000. Due to its stiffness, optomechanical resonator 120 can be described as an ideal harmonic oscillator, and displacements of the test mass of the optomechanical resonator prototype show a linear spectral response below the resonance frequency. The optomechanical resonator prototype's acceleration-sensitive axis was aligned collinearly with the mirror's normal vector by orienting the outer edges of both devices parallel. The cantilever was read out (i.e., displacement of test mass 210 was measured) with a fiber-based optical setup using telecom components, including a tunable laser operating at a wavelength near 1560 nm (see FIG. 6e). The optical beam reflected from Fabry-Perot cavity 234 of the optomechanical resonator prototype was separated with an optical circulator, read out on a photodiode, and digitally processed into an optical resonator signal. The intensity variations of the optical resonator signal depend on the transmission of optomechanical resonator 120 and, hence, the distance between the two fiber ends. The setup was operated under normal atmospheric conditions. The prototype was mounted on a solid aluminum plate resting on a piezoelectric transducer tripod. The tripod was mounted on a vibration isolation platform, enabling controlled actuation of the optomechanical resonator prototype to simulate an environment subject to vibrational noise.

FIG. 6b is a spacetime diagram showing how the atom interferometer implements a Mach-Zehnder-type measurement of gravitational acceleration g. FIG. 6c is a plot of raw data (i.e., normalized population as a function of time)

obtained from the atom interferometer. FIG. 6d is a plot of the optical resonator signal from the prototype optomechanical resonator.

Figure 7:
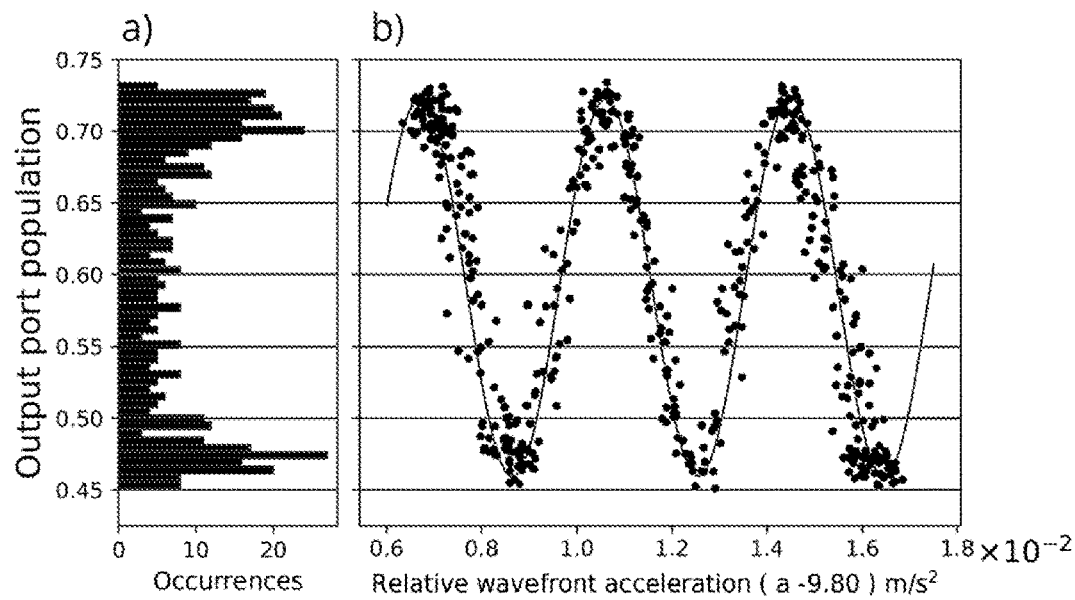
FIG. 7 illustrates how an optical resonator signal was used to post-correct raw data from an atom interferometer.

FIG. 7 illustrates how the optical resonator signal was used to post-correct raw data from the atom interferometer. FIG. 7a is a histogram of the normalized signal of the atom interferometer output port without correction. FIG. 7b is a plot of the normalized signal after corrected with the optical resonator signal (circles). FIG. 7b also shows a sinusoidal fit to the corrected data with T=10 ms (solid line). To obtain the data in FIG. 7, hybrid device 602 was operated at a time T=10 ms. The square mirror was set in motion by driving the piezoelectric tripod with a sinusoidal signal at 350 Hz, corresponding to a weighted RMS acceleration noise of $3.25 \times 10^{-3}$ m/s$^2$ per cycle such that the phase excursion exceeds a single fringe and the readout appears random due to the underlying $2\pi$ phase ambiguity. As shown in FIG. 7a, the histogram of the uncorrected atom-interferometer data has a bimodal distribution. In general, the histogram's shape depends on the piezoelectric drive amplitude, reflecting the spectral type of vibration noise. To correct the raw atom-interferometer data, the optical resonator signal was convolved with the atom interferometer's transfer function to compute phase corrections that were then applied to the raw atom-interferometer data. As shown in FIG. 7b, the corrected data fully reconstructs the expected atom interferometer response.

Figure 8:
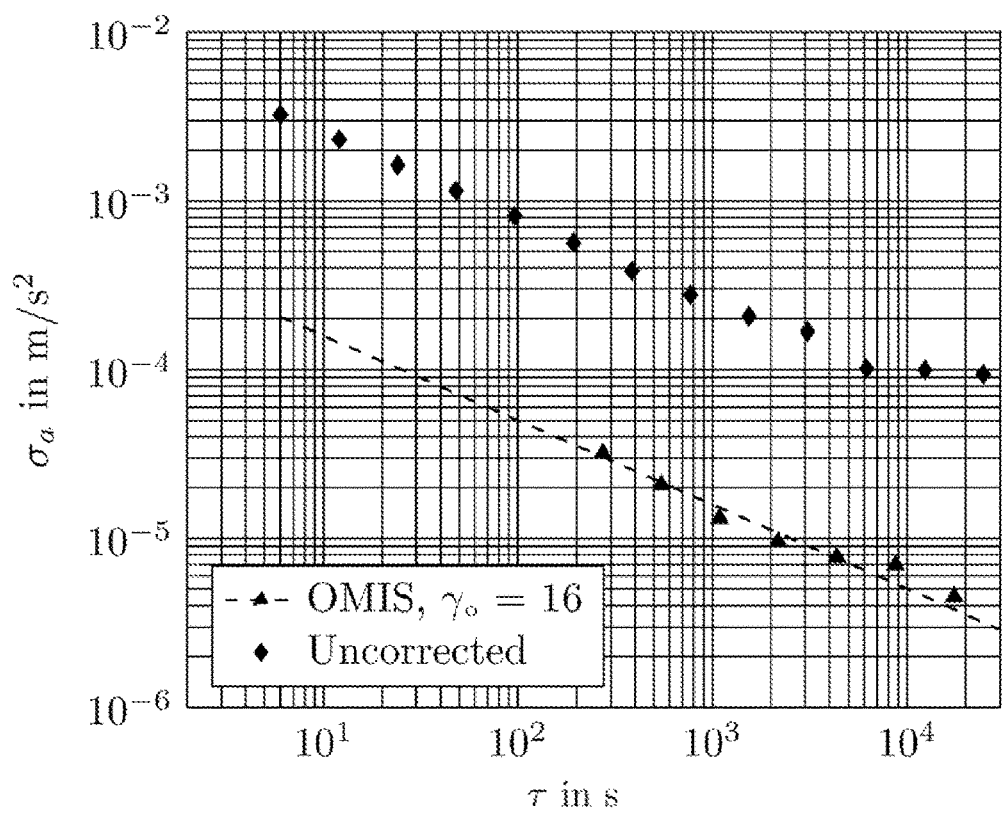
FIG. 8 is a plot of the short-term acceleration instability $\sigma_a$ of the hybrid device of FIG. 6 as a function of integration time $\tau$.

FIG. 8 is a plot of the short-term acceleration instability $\sigma_a$ of hybrid device 602 as a function of integration time $\tau$. In FIG. 8, diamonds represent uncorrected data weighted with the atom interferometer's transfer function, while triangles represent the measurements post-corrected with the optical resonator signal. Post-correcting the atom-interferometer data with the optical resonator signal improved the short-term stability of hybrid device 602 by a factor of $\gamma_0$=16, which is calculated from the ratio of the instabilities with ($\sigma$=5×10$^{-4}$ m/s$^2$ at 1 s) and without ($\sigma$=8×10$^{-3}$ m/s$^2$ at 1 s) correction. The dashed line represents a fit following a $1/\sqrt{\tau}$ power law.

Moreover, hybrid device 602 was used to measure gravitational acceleration g in a drop-out-free measurement lasting 19.5 hours. For this measurement, the atom interferometer was operated in two settings in which the atoms were scattered either upward or downward during the first beam-splitting process to suppress systematic effects. After extracting the interferometer response's amplitude and offset through histogram fits on bins of 545 shots, or about 25 min, g was subsequently determined by fitting data sets of 50 shots for each direction of momentum transfer, solely leaving the interferometer phase as a free parameter from which an acceleration value for upward and downward operation is determined and for which g is derived as the mean value. The histogram of FIG. 7a is one example of these histograms.

The acceleration noise of the optomechanical resonator prototype was measured to be $5 \times 10^{-4}$ m/s$^2$/Hz$^{1/2}$. With all other noise sources being two to three orders of magnitude lower, this acceleration noise exceeds the intrinsic noise of the atom interferometer. It is caused by both residual intensity noise of the source laser and optical fiber to the optomechanical resonator. Indeed, millimeter-sized optomechanical resonators have demonstrated sensitivities of $1 \times 10^{-6}$ m/s$^2$/Hz$^{1/2}$ over bandwidths up to 12 kHz. Moreover, spectroscopy techniques developed for ultrastable resonators can be exploited to improve the performance of the readout.

As the optomechanical resonator's sensitivity to accelerations depends quadratically on the resonance frequency and linearly on the finesse, there is room for improvements by trading sensitivity against smaller dynamic range. For an optomechanical resonator with a resonance frequency of 1500 Hz and improved readout, a compact gravimeter with a pulse separation time of T=35 ms and a repetition rate of 1 Hz is expected to be vibration limited to $\sigma_a$=6×10$^{-8}$ m/s$^2$ at 1 s without seismic isolation and assuming ideal correlation with the OMA (see FIG. 9). Noting that many atomic gravimeters employ rubidium and generate the light for manipulating the atoms by second harmonic generation with telecom fiber lasers, the inclusion of this sensor requires only mirror hardware changes in this case and can be performed with an all-fibered setup.

Figure 9:
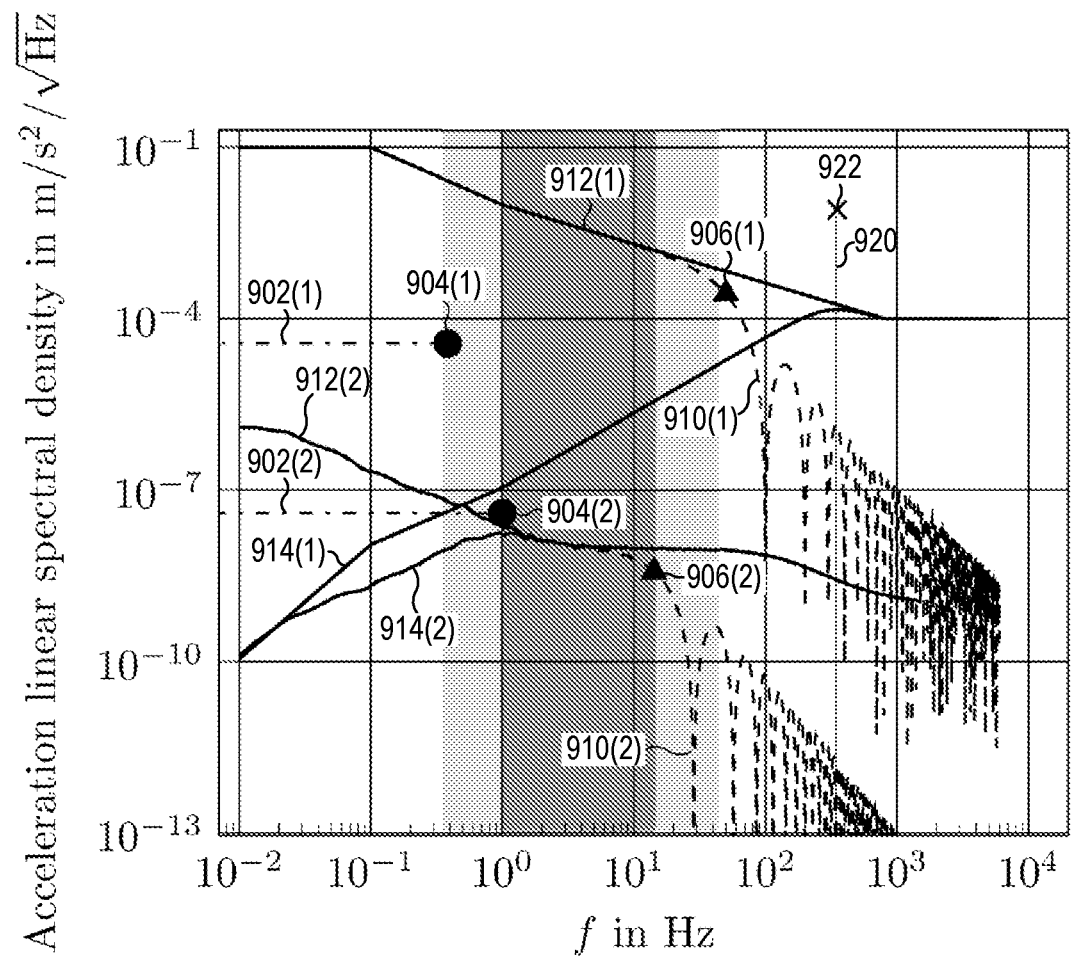
FIG. 9 is a spectral density plot of acceleration noise that shows expected performance of the hybrid device of FIG. 6.

FIG. 9 is a spectral density plot of acceleration noise that shows expected performance of hybrid device 602. In FIG. 9, two cases are considered. In a first case corresponding to what was experimentally demonstrated, a first circle 902(1) indicates the acceleration sensitivity of a rubidium atom interferometer operating at T=10 ms, a repetition rate of $f_c$=0.4 Hz, a $2\hbar k$ momentum transfer, and a phase noise of 60 mrad. In a second case corresponding to improved projected performance, a second circle 904(2) indicates the acceleration sensitivity of a rubidium atom interferometer operating at T=35 ms, a repetition rate of $f_c$=1 Hz, an $8\hbar k$ momentum transfer, and a phase noise of 3 mrad. Triangles 906(1) and 906(2) indicate the atom interferometer's corner frequency of 1/(2T) for the first and second cases, respectively. The shaded area bounded by each repetition rate $f_c$ and the corresponding corner frequency (i.e., between each circle 904 and the corresponding triangle 906) mark the frequency bands most relevant for optimal post-correction of seismic noise.

In FIG. 9, a first dashed line 910(1) represents the intrinsic noise of optomechanical resonator 120 weighted with the atom interferometer transfer function for the first case described above. Similarly, a second dashed line 910(2) represents the intrinsic noise of optomechanical resonator 120 weighted with the atom interferometer transfer function for the second case described above. A first solid line 912(1) represents the acceleration sensitivity of optomechanical resonator 120 when configured with a resonance frequency of 7.7 kHz, while a second solid line 912(2) represents the acceleration sensitivity of the optomechanical resonator 120 when configured with a resonance frequency of 1.5 kHz. Lines 914(1) and 914(2) show digital high-pass filters employed on the optical resonator signal for optomechanical resonator 120 with resonance frequencies of 7.7 kHz and 1.5 kHz, respectively. A vertical line 920 marks the driving frequency of the piezoelectric tripod at 350 Hz, which results in an effective acceleration of 8×10$^{-3}$ m/s$^2$/Hz$^{1/2}$ (see black cross 922), as experimentally demonstrated.

Method Embodiments

In embodiments, a hybrid interferometry method includes measuring an acceleration of a frame along a sensing direction by optically sensing a displacement of a test mass relative to the frame along the sensing direction. The test mass is physically coupled with the frame via one or more bridges. The method also includes measuring, with an atom interferometer, an acceleration of the test mass along the sensing direction by reflecting an optical beam into a reflected optical beam with a reflector affixed to the test mass. The optical beam and reflected optical beam counter-propagate along the sensing direction to interact with atoms of the atom interferometer. The method may be implemented with optomechanical inertial reference mirror 300 of FIGS. 3-5. For example, acceleration 140 of frame 204 can be measured along sensing direction 142 by optically sensing a displacement of test mass 210. Furthermore, reflector 302 on top surface 304 reflects light pulse 112 into reflected light pulse 118, wherein light pulses 112 and 118 interact with atoms 114 as part of a measurement cycle of atom interferometer 110.

In some embodiments of the method, optically sensing the displacement of the test mass includes optically sensing a cavity spacing of a Fabry-Perot cavity formed from first and second cavity mirrors counterfacing along the sensing direction. The frame includes the first cavity mirror and the test mass includes the second cavity mirror. In one example, displacement of test mass 210 is measured by optically sensing frequency shifts in a resonance of Fabry-Perot cavity 234 formed from first and second mirror-coated faces 226 and 222 (see FIG. 4).

Any of the above method embodiments may include correcting the measured acceleration of the test mass with the measured acceleration of the frame. For example, an optical resonator signal obtained from optomechanical resonator 120 may be convolved with a transfer function of atom interferometer 110 to compute phase corrections. These phase corrections may then be applied to raw data from atom interferometer 110.

In other embodiments, a hybrid interferometry method includes measuring an acceleration of a frame along a sensing direction by optically sensing a displacement of a test mass relative to the frame along the sensing direction. The test mass is physically coupled with the frame via one or more bridges. The method also includes measuring, with an atom interferometer, an acceleration of the frame along the sensing direction by reflecting an optical beam into a reflected optical beam with a mirror affixed to the frame. The optical beam and reflected optical beam counterpropagate along the sensing direction to interact with atoms of the atom interferometer. The method may be implemented with optomechanical inertial reference mirror 100 of FIGS. 1 and 2. For example, acceleration 140 of frame 204 can be measured along sensing direction 142 by optically sensing a displacement of test mass 210. Furthermore, reflector 116 retroreflects light pulse 112 into reflected light pulse 118, wherein light pulses 112 and 118 interact with atoms 114 as part of a measurement cycle of atom interferometer 110.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) An optomechanical inertial reference mirror may include a first cavity mirror affixed to a frame, and a test mass physically coupled with the frame via one or more bridges such that the test mass is displaced along a sensing direction relative to the frame when the frame accelerates along the sensing direction. The optomechanical inertial reference mirror may further include a reflector affixed to the test mass and configured to reflect an optical beam propagating along the sensing direction, and a second cavity mirror affixed to the test mass. The first and second cavity mirrors may be counterfacing along the sensing direction to form a Fabry-Perot cavity with a cavity spacing that changes when the test mass is displaced relative to the frame along the sensing direction.

(A2) In the device denoted as (A1), each of the one or more bridges may extend from the test mass to the frame along a direction perpendicular to the sensing direction.

(A3) In either one of the devices denoted (A1) and (A2), a reflective face of the reflector and a reflective face of the second cavity mirror may be parallel.

(A4) In any one of the devices denoted (A1) through (A3), the reflector may be a turning mirror configured to change a propagation direction of the optical beam.

(A5) In any one of the devices denoted (A1) through (A3), the reflector may be a retroreflector configured to retroreflect the optical beam along the sensing direction.

(A6) In any one of the devices denoted (A1) through (A5), the reflector may include an optical coating deposited onto the test mass.

(A7) In any one of the devices denoted (A1) through (A5), the reflector may include a sub-wavelength grating.

(A8) In any one of the devices denoted (A1) through (A7), the first cavity mirror may be an optical fiber with a first mirror-coated face counterfacing the second cavity mirror.

(A9) In the device denoted (A8), the second cavity mirror may be a fiber-optic-based mirror with a second mirror-coated face, wherein the first mirror-coated face and the second mirror-coated face are counterfacing.

(A10) In any one of the devices denoted (A1) through (A8), the second cavity mirror may include an optical coating deposited onto the test mass.

(A11) In any one of the devices denoted (A1) through (A10), a volume of the optomechanical inertial reference mirror may be less than one cubic centimeter.

(B1) An optomechanical resonator may include a first cavity mirror affixed to a frame, a substrate affixed to the frame, and a test mass physically coupled with the frame via one or more bridges such that the test mass is displaced along a sensing direction relative to the frame when the frame accelerates along the sensing direction. The optomechanical resonator may further include a second cavity mirror affixed to the test mass, and a reflector affixed to the substrate and configured to reflect an optical beam propagating along the sensing direction. The first and second cavity mirrors may be counterfacing along the sensing direction to form a Fabry-Perot cavity with a cavity spacing that changes when the test mass is displaced relative to the frame along the sensing direction.

(B2) In the device denoted as (B1), each of the one or more bridges may extend from the test mass to the frame along a direction perpendicular to the sensing direction.

(B3) In either one of the devices denoted (B1) and (B2), a reflective face of the reflector and a reflective face of the second cavity mirror may be parallel.

(B4) In any one of the devices denoted (B1) through (B3), the reflector may be a turning mirror configured to change a propagation direction of the optical beam.

(B5) In any one of the devices denoted (B1) through (B3), the reflector may be a retroreflector configured to retroreflect the optical beam along the sensing direction.

(B6) In any one of the devices denoted (B1) through (B5), the reflector may include an optical coating deposited onto the substrate.

(B7) In any one of the devices denoted (B1) through (B5), the reflector may be a sub-wavelength grating.

(B8) In any one of the devices denoted (B1) through (B7), the first cavity mirror may be an optical fiber with a first mirror-coated face counterfacing the second cavity mirror.

(B9) In the device denoted (B8), the second cavity mirror may be a fiber-optic-based mirror with a second mirror-coated face, wherein the first mirror-coated face and the second mirror-coated face are counterfacing.

(B10) In any one of the devices denoted (B1) through (B8), the second cavity mirror may include an optical coating deposited onto the test mass.

(B11) In any one of the devices denoted (B1) through (B10), the substrate may be affixed to the frame via one of epoxy, contact bonding, and anodic bonding.

(B12) In any one of the devices denoted (B1) through (B10), the substrate and the frame may be formed as a monolithic element.

(B13) In any one of the devices denoted (B1) through (B12), the optomechanical inertial reference mirror may have a volume less than one cubic centimeter.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A hybrid interferometer, comprising:
a first cavity mirror affixed to a frame;
a test mass physically coupled with the frame via one or more bridges such that the test mass is displaced along a sensing direction relative to the frame when the frame accelerates along the sensing direction;
a reflector affixed to the test mass;
a second cavity mirror affixed to the test mass and cooperating with the first cavity mirror to form a Fabry-Perot cavity with a cavity spacing that changes when the test mass is displaced relative to the frame along the sensing direction; and
an atom interferometer configured to measure acceleration of the test mass along the sensing direction using an optical beam that propagates along the sensing direction and is reflected by the reflector.

2. The hybrid interferometer of claim 1, each of the one or more bridges extends-extending from the test mass to the frame along a direction perpendicular to the sensing direction.

3. The hybrid interferometer claim 1, a reflective face of the reflector lying parallel to a reflective face of the second cavity mirror.

4. The hybrid interferometer of claim 1, the reflector comprising a turning mirror.

5. The hybrid interferometer of claim 1, the reflector comprising a retroreflector.

6. The hybrid interferometer of claim 1, the reflector comprising an optical coating or sub-wavelength grating located on the test mass.

7. The hybrid interferometer of claim 1, one or both of the first and second cavity mirrors comprising an optical fiber with a mirror-coated face.

8. The hybrid interferometer of claim 1, the second cavity mirror comprising an optical coating located on the test mass.

9. A hybrid interferometer, comprising:
a first cavity mirror affixed to a frame;
a test mass physically coupled with the frame via one or more bridges such that the test mass is displaced along a sensing direction relative to the frame when the frame accelerates along the sensing direction;
a second cavity mirror affixed to the test mass and cooperating with the first cavity mirror to form a Fabry-Perot cavity with a cavity spacing that changes when the test mass is displaced relative to the frame along the sensing direction;
a reflector affixed to the frame; and
an atom interferometer configured to measure acceleration of the frame along the sensing direction using an optical beam that propagates along the sensing direction and is reflected by the reflector.

10. The hybrid interferometer of claim 9, a reflective face of the reflector lying parallel to a reflective face of the second cavity mirror.

11. The hybrid interferometer of claim 9, the reflector comprising a turning mirror.

12. The hybrid interferometer of claim 9, the reflector comprising a retroreflector.

13. The hybrid interferometer of claim 9, the reflector comprising an optical coating or sub-wavelength grating located on a substrate affixed to the frame.

14. The hybrid interferometer of claim 9, one or both of the first and second cavity mirrors comprising an optical fiber with a mirror-coated face.

15. A method for hybrid interferometry, comprising:
measuring an acceleration of a frame along a sensing direction by optically sensing a displacement of a test mass relative to the frame along the sensing direction, the test mass being physically coupled with the frame via one or more bridges; and
measuring, with an atom interferometer, an acceleration of the test mass along the sensing direction by reflecting an optical beam into a reflected optical beam with a reflector affixed to the test mass, the optical beam and the reflected optical beam counterpropagating along the sensing direction to interact with atoms of the atom interferometer.

16. The method of claim 15, wherein said optically sensing the displacement of the test mass includes optically sensing a cavity spacing of a Fabry-Perot cavity formed from first and second cavity mirrors counterfacing along the sensing direction, the frame including the first cavity mirror and the test mass including the second cavity mirror.

17. The method of claim 15, further comprising correcting the measured acceleration of the test mass with the measured acceleration of the frame.

18. A method for hybrid interferometry, comprising:
measuring an acceleration of a frame along a sensing direction by optically sensing a displacement of a test mass relative to the frame along the sensing direction, the test mass being physically coupled with the frame via one or more bridges; and
measuring, with an atom interferometer, an acceleration of the frame along the sensing direction by reflecting an optical beam into a reflected optical beam with a reflector affixed to the frame, the optical beam and the reflected optical beam counterpropagating along the sensing direction to interact with atoms of the atom interferometer.

19. The method of claim 18, wherein said optically sensing the displacement of the test mass includes optically sensing a cavity spacing of a Fabry-Perot cavity formed from first and second cavity mirrors counterfacing along the sensing direction, the frame including the first cavity mirror and the test mass including the second cavity mirror.

20. The method of claim 18, further comprising correcting the acceleration measured by optically sensing with the acceleration measured by the atom interferometer.

21. A method for hybrid interferometry, comprising:
optically measuring the cavity spacing of the Fabry-Perot cavity of the hybrid interferometer of claim 1; and
reflecting, with the reflector of the hybrid interferometer, an optical beam emitted by the atom interferometer of the hybrid interferometer.

22. A method for hybrid interferometry, comprising:
optically measuring the cavity spacing of the Fabry-Perot cavity of the hybrid interferometer of claim 9; and
reflecting, with the reflector of the hybrid interferometer, an optical beam emitted by the atom interferometer of the hybrid interferometer.

* * * * *

UNITED STATES PATENT AND TRADEMARK OFFICE
CERTIFICATE OF CORRECTION

PATENT NO. : 11,867,713 B2
APPLICATION NO. : 17/430797
DATED : January 9, 2024
INVENTOR(S) : Felipe Guzmán, Ernst Maria Rasel and Dennis Schlippert Page 1 of 1

It is certified that error appears in the above-identified patent and that said Letters Patent is hereby corrected as shown below:

On the Title Page

On page 2, right column, item (56) OTHER PUBLICATIONS, the last entry should read --Richardson et al., Opto-mechanical resonator-enhanced atom interferometry, https://arxiv.org/abs/1902.02867v1, Feb. 7, 2019.--.

Signed and Sealed this
Thirteenth Day of February, 2024

Katherine Kelly Vidal
*Director of the United States Patent and Trademark Office*